March 28, 1961    N. W. LOWE, JR    2,976,621
EDUCATIONAL DEVICE FOR TEACHING SPELLING
Filed April 7, 1959    2 Sheets-Sheet 1

Newton W. Lowe, Jr.
INVENTOR.

March 28, 1961  N. W. LOWE, JR  2,976,621
EDUCATIONAL DEVICE FOR TEACHING SPELLING
Filed April 7, 1959  2 Sheets-Sheet 2
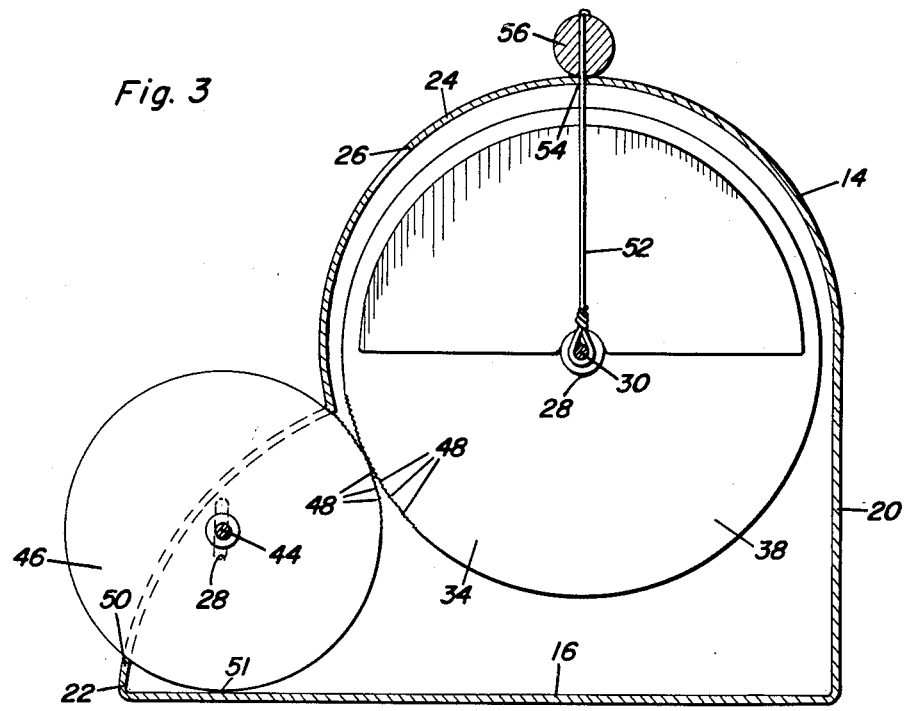
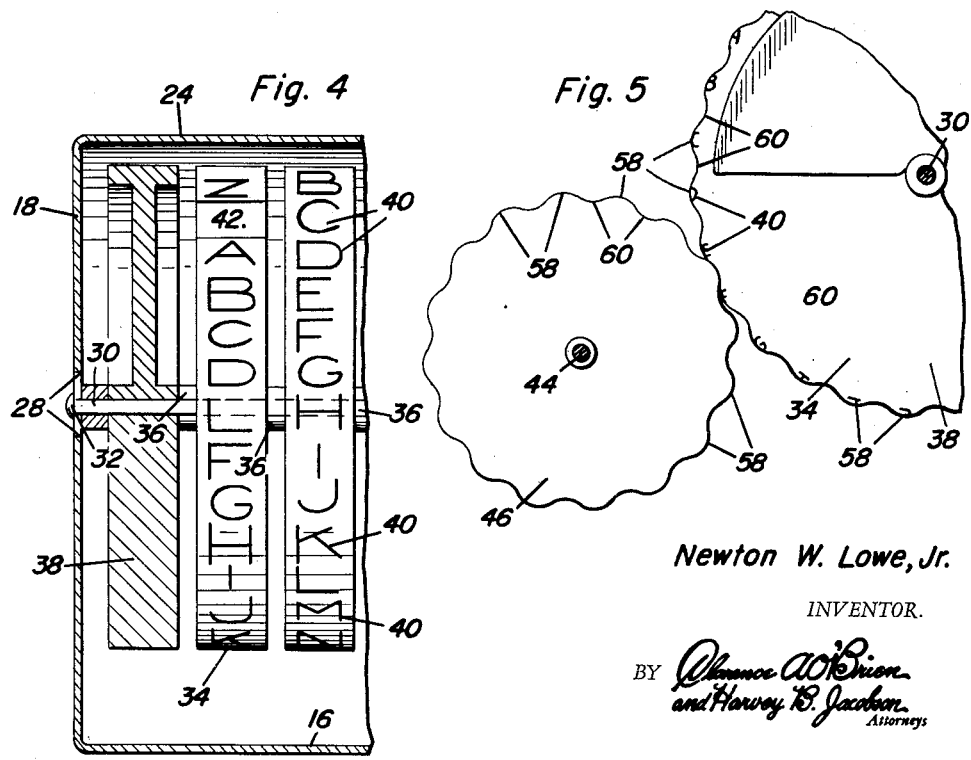
Newton W. Lowe, Jr.
INVENTOR.

ent Office 2,976,621
Patented Mar. 28, 1961

2,976,621
EDUCATIONAL DEVICE FOR TEACHING SPELLING

Newton W. Lowe, Jr., Miami, Fla.
(Rte. 2, Box 180, Naples, Fla.)

Filed Apr. 7, 1959, Ser. No. 804,823

11 Claims. (Cl. 35—77)

This invention relates to an educational device to be used as an aid for students in helping them to learn to spell, and more particularly to a device having a plurality of wheels, each of which has a space thereon for each letter of the alphabet plus an additional space which is blank.

The main object of this invention is to provide an educational device which may be used with one or more students, that will greatly benefit a teacher in the process of teaching students to spell.

A further object of this invention, in accordance with the preceding object, is to provide a device which may be used successfully in connection with students of all ages.

A still further object of this invention, in accordance with the preceding objects, is to provide an educational device which may be used in teaching students of all ages the fundamental rules of spelling.

A still further object of this invention is to provide an educational device having a plurality of letter wheels in side-by-side relation with each wheel having spaces thereon containing the letters of the alphabet with an additional blank space on each wheel so that the wheels may be aligned and retained in position to spell out a word or words.

A still further object, in accordance with the preceding object, is to provide a means by which the blank space on each wheel may be aligned with the blank space on the other wheels so that a new word may be spelled.

Another object, in accordance with the preceding objects, is to provide an educational device that is economical to manufacture and lends itself to conventional methods of mass production and manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical transverse sectional view taken substantially upon the plane indicated by the section line 3—3 of Figure 1, showing the manner in which the letter wheels may be moved into their adjusted positions;

Figure 4 is an enlarged horizontal longitudinal sectional view of the invention taken substantially upon the plane indicated by the section line 4—4 of Figure 1, showing the manner in which the letter wheels are mounted upon their supporting shaft; and Figure 5 is an enlarged detail view of a modification of the letter wheel and actuating wheel.

Figure 1:
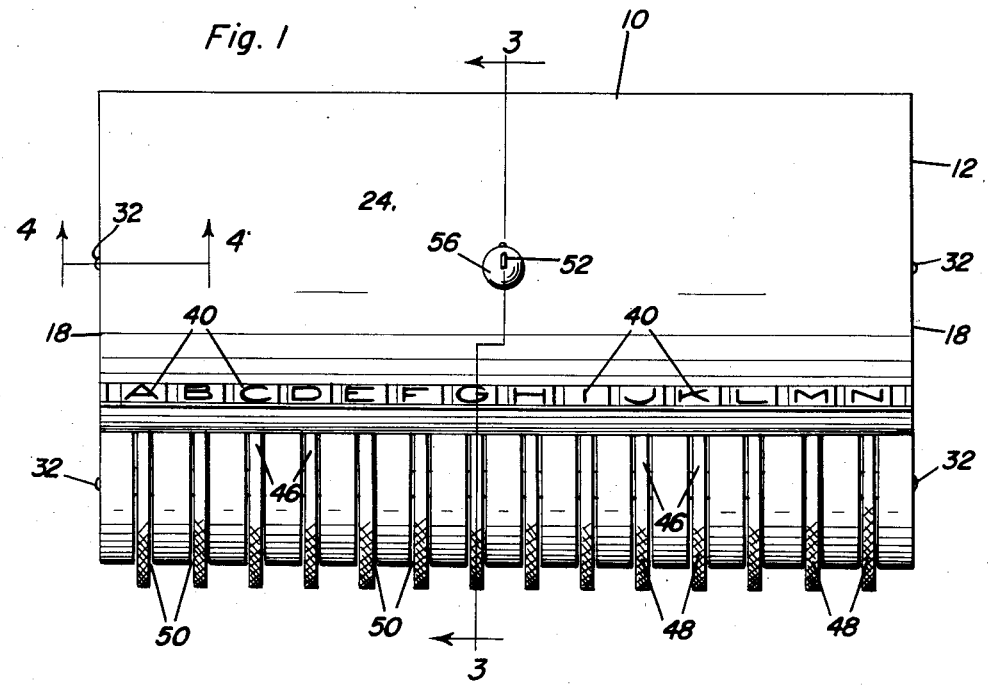
Figure 1 is a top plan view of the invention clearly showing the manner in which the selectively aligned letter wheels may be viewed through the window.
Figure 2:
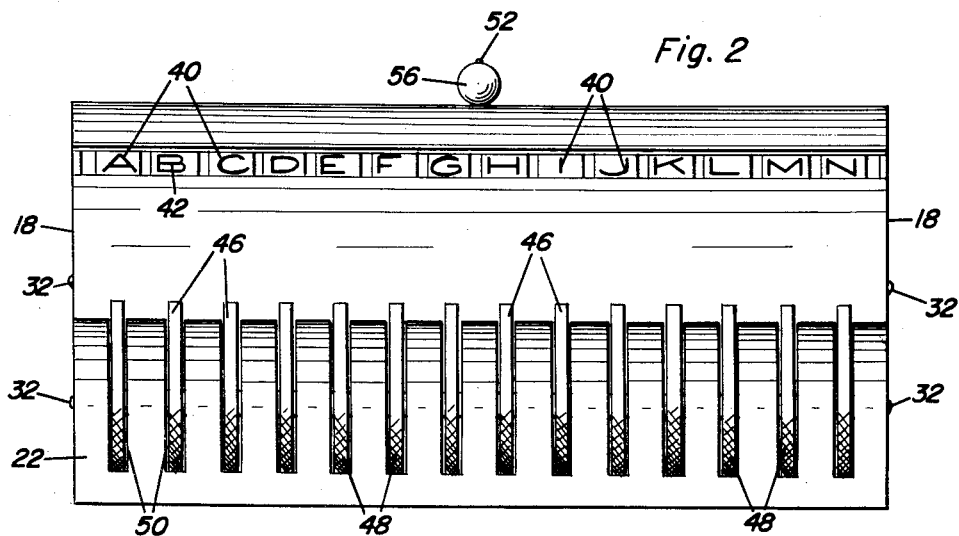
Figure 2 is a side elevational view of the invention as seen in Figure 1.

Referring now more specifically to the drawings, the numeral 10 generally designates the educational device comprising the present invention having a casing 12, the upper portion 14 thereof being semi-circular in cross-section. The case 12 comprises a bottom 16, end walls 18, rear wall 20, front wall 22, and top wall 24.

Formed in the top wall 24 of the upper portion 14 is a longitudinally extending window 26 which extends substantially the entire length of the casing 12.

Journalled through slots 28 formed in end walls 18, and extending longitudinally through the casing 12 is an axle member 30. Axle member 30 is retained in position with the end thereof extending through end wall 18, by means of enlarged head portions 32 formed on each end of the axle member 30. Rotatably mounted upon axle member 30, in longitudinal spaced relation, are letter wheels 34 which have spacer elements 36 rotatably mounted on axle member 30 therebetween.

Each letter wheel 34 has placed on its outer periphery in spaced relation and in any convenient manner, all of the letters 40 of the alphabet and a blank space 42. A counterweight 38 is formed on each letter wheel 34 and the blank space 42 of each is so positioned that while the letter wheel is at rest with its counterweight 38 centered beneath the axle member, the blank space will be in alignment with the window 26.

Also journalled and secured through the end walls 18 in the same manner as the axle member 30, is an axle shaft 44. Rotatably mounted on axle shaft 44 are positioning or dial wheels 46, each partially extending through one of the slots 50 formed in the front wall 22 and in alignment with the corresponding letter wheel 34, and spaced by spacer elements, not shown, in the same manner as with spacer elements 36.

The outer periphery of each of the letter wheels 34 is in contacting relation with the outer periphery of the corresponding dial wheel 46. The outer periphery of each are knurled or provided with any suitable toothed surfaces at 48, see Figure 3. By manipulating the dial wheel 46, the letter wheel 34 is turned in the opposite direction, and different letters 40 thereon are registered in the window 26. In this manner, successive positioning wheels may be manipulated to cause the desired letters 40 on each of the corresponding letter wheels 34 to be registered with the window 26. In this manner letters of a word may be positioned within the window 26. Each of the dial wheels 46 are in frictional contact with the bottom 16 of the casing 12 as at 51, and are held in position by the frictional contact therewith. It is to be understood that a piece of resilient rubber or other suitable material (not shown) could be positioned beneath the dial wheel 46 on the bottom 16 so as to provide more friction between the dial wheels 46 and the bottom 16 for more effectively retaining the dial wheels in position. Also, it is to be understood that at least one or both of the axles could be mounted in slots formed in projections on the inside of the casing 12 which would eliminate any unwanted openings in the sides of the casing 12.

Secured about the center of the axle member 30 is one end of a wire 52 with the other end extending upward through the top wall 22 by means of an aperture 54 therethrough. Secured to the upper end of the wire 52 is a knob 56 which may be used to raise the axle member 30 so as to cause the letter wheels 34 to become disengaged with the dial wheels 46 thus allowing the counterweights 28 of each letter wheel 34 to position the blank spaces 42 thereof in registry with the window 26.

With attention now drawn to Figure 5 of the drawings, a modified form of the dial wheel 46 and the letter wheel 34 is shown. In place of the knurled surfaces 48, there is provided on each dial wheel 46 and letter wheel 34 a series of projections 58 and recesses 60. The letters 40 on the letter wheels 34 are formed on the projections 58. The projections 58 and the recesses 60 of each of the dial wheels 46 are engageable with the recesses 60 and the projections 58 respectively of each of the letter wheels 34.

In operation, each of the dial wheels 46 are successively manipulated to position the desired letter 40 of the letter wheel 34 in the correct position registering with the window 26 of the casing 12. It is to be understood that although the letters 40 are shown on the letter wheels 34, that any design or character could be placed upon the letter wheels 34 if it was desired.

The material utilized to construct the case 12, letter wheels 34, and the dial wheels 46 may be any convenient material since there is no particular demand for the use of a specific type of material.

It can now readily be seen that an educational device has been provided which will be beneficial to existing educational systems as well as a device which may be used in many forms of games.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational device comprising a casing, an axle member mounted in said casing, a plurality of aligned letter wheels rotatably mounted on said axle, indicia formed on the outer peripheral edge of each of said letter wheels, a window parallel to said axle in said casing for viewing the indicia on said letter wheels, positioning means engageable with each of said letter wheels wherein the latter may be adjusted in rotated positions, retaining means engageable with said positioning means for retaining said letter wheels in adjusted positions, said axle member being mounted in upstanding slots formed in opposite sides of said casing, the upper end of said slots being a greater distance from said positioning means than the lower ends of said slots, means operatively connected to said axle for raising said axle in said slots and disengaging the letter wheels from said positioning means.

2. The combination of claim 1 wherein each of said letter wheels includes a blank space between a pair of consecutive indicia, means on each of said letter wheels yieldingly urging each of the same into a position with its blank space in registry with said window.

3. The combination of claim 2 wherein said urging means comprise counterweights on each of said letter wheels urging the letter wheels into position with the blank space of each registered with said window.

4. The combination of claim 3 wherein the outer peripheral surface of each of said letter wheels is knurled and engages the positioning means.

5. An educational device comprising a casing, an axle member mounted in said casing, a plurality of aligned letter wheels rotatably mounted on said axle, indicia formed on the outer peripheral edge of each of said letter wheels, a window parallel to said axle in said casing for viewing the indicia on said letter wheels, positioning means engageable with each of said letter wheels wherein the latter may be adjusted in rotated positions, retaining means engageable with said positioning means for retaining said letter wheels in adjusted positions, a shaft member mounted in said casing parallel to said axle member, said positioning means comprising a plurality of dial wheels equal in number to said letter wheels and rotatably mounted on said shaft member, the outer periphery of each dial wheel being in frictional engagement and transverse alignment with the outer periphery of one of said letter wheels and in frictional engagement with said retaining means for retaining said dial wheels in adjusted relation, one of said members mounted for lateral movement relative to the other, means for moving said one member relative to the other member to move said letter wheels from engagement with said dial wheels.

6. The combination of claim 5 wherein said axle member is journalled in upstanding slots formed in opposite sides of said casing, the upper end of said slots being a greater distance from said positioning means than the lower ends of said slots.

7. The combination of claim 6 wherein said moving means includes means operatively connected to said axle for raising said axle in said slots and disengaging the letter wheels from said positioning means.

8. The combination of claim 7 including a blank space on each of said letter wheels registrable with said window, means on each of said letter wheels yieldingly urging each of the same into a position with its blank space in registry with said window.

9. The combination of claim 8 wherein said urging means comprises counterweights on each of said letter wheels urging the letter wheels into position with the blank space of each registered with said window.

10. The combination of claim 9 wherein the outer peripheral surface of each of said letter wheels is knurled and engages the positioning means.

11. An educational device comprising a casing having opposite walls interconnected by a bottom wall, an axle member, means on said casing journalling said axle member therein, a plurality of aligned letter wheels rotatably mounted on said axle member, indicia formed on the outer peripheral edge of each of said letter wheels, a window in said casing parallel to said axle for viewing the indicia on said letter wheels, an axle shaft, means on said casing journalling said axle shaft therein in substantially parallel relation to said axle member, a plurality of positioning wheels rotatably journaled on said axle shaft, said journalling means for said axle member and said axle shaft comprising upstanding slots formed in said opposite walls, said slots for said axle shaft having their lowermost ends sufficiently close to said bottom wall whereby the positioning wheels will be supported by said bottom wall and frictionally retained in adjusted rotated positions, said slots for said axle member being of a length and positioned to support said letter wheels above corresponding positioning wheels and aligned therewith with said letter wheels each overlapping the corresponding positioning wheel and enabling said letter wheels to rest thereupon, said slots for said axle member enabling the latter to be lifted in order to move said letter wheels out of engagement with said positioning wheels.

References Cited in the file of this patent

UNITED STATES PATENTS

| | | |
|---|---|---|
| 584,219 | De Grain | June 8, 1897 |
| 863,997 | Jahn | Aug. 20, 1907 |
| 1,256,224 | Habart | Feb. 12, 1918 |
| 2,554,942 | Dobrowsky | May 29, 1951 |
| 2,731,267 | Brenner | Jan. 17, 1956 |

FOREIGN PATENTS

| | | |
|---|---|---|
| 641,771 | Great Britain | Aug. 16, 1950 |